April 29, 1941.  M. HEIDELMEYER ET AL  2,240,214
CONVEYER SYSTEM FOR THE MOLDS IN MACHINES FOR CASTING OR
MOLDING CHOCOLATE OR LIKE MASSES
Filed Jan. 21, 1938  4 Sheets-Sheet 2

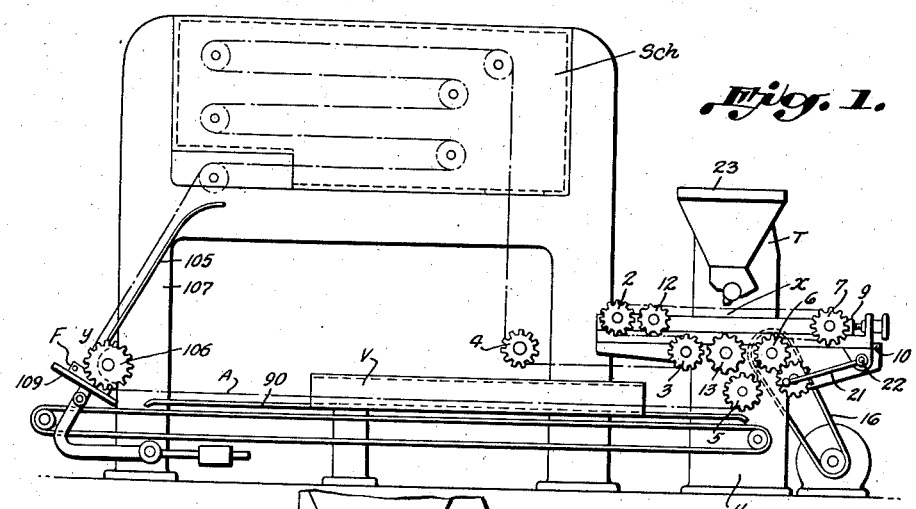
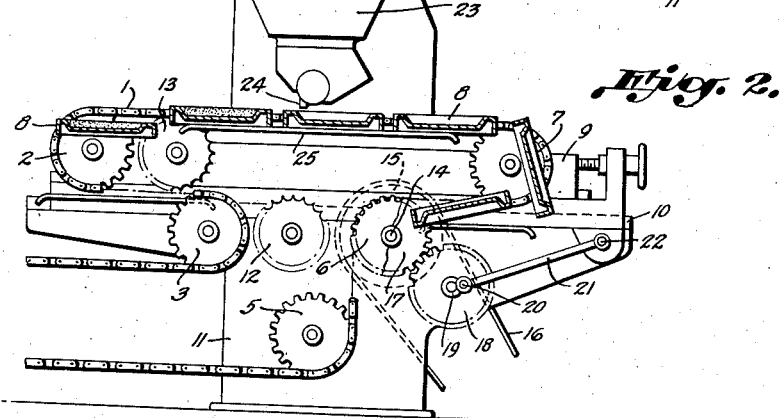
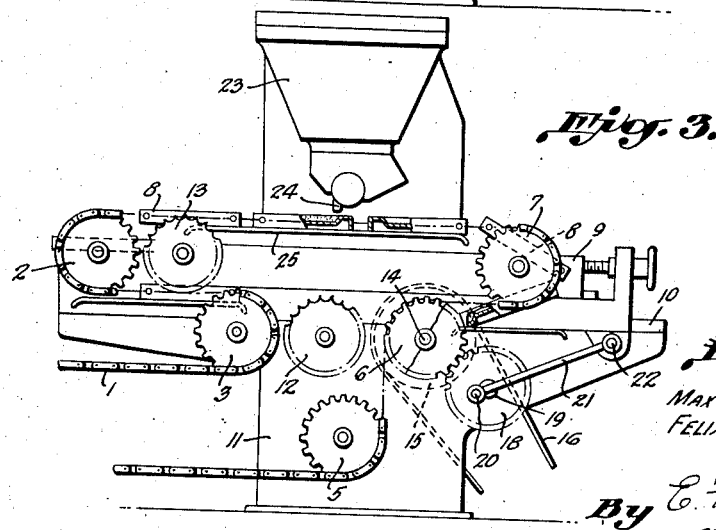

Inventors:
Max Heidelmeyer &
Felix Becher
By E. F. Wenderoth
Attorney

April 29, 1941.    M. HEIDELMEYER ET AL    2,240,214
CONVEYER SYSTEM FOR THE MOLDS IN MACHINES FOR CASTING OR
MOLDING CHOCOLATE OR LIKE MASSES
Filed Jan. 21, 1938    4 Sheets-Sheet 3

Inventors:
MAX HEIDELMEYER &
FELIX BECHER
By C. F. Wenderoth
Attorney

April 29, 1941.　　　M. HEIDELMEYER ET AL　　　2,240,214
CONVEYER SYSTEM FOR THE MOLDS IN MACHINES FOR CASTING OR
MOLDING CHOCOLATE OR LIKE MASSES
Filed Jan. 21, 1938　　　4 Sheets-Sheet 4
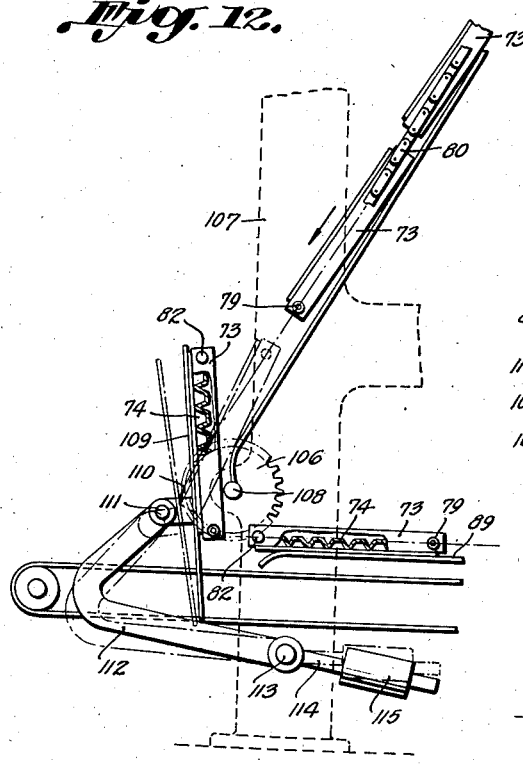
Fig. 12.
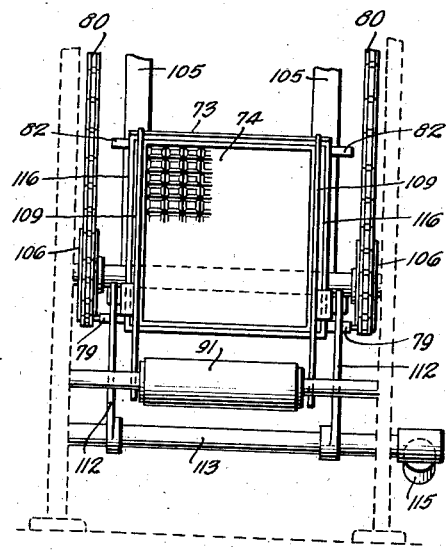
Fig. 13.
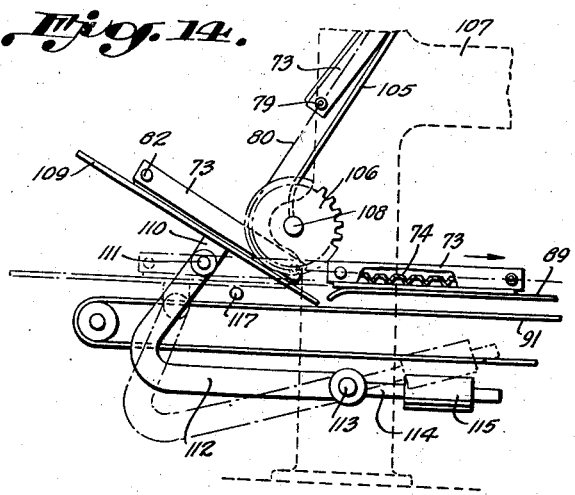
Fig. 14.
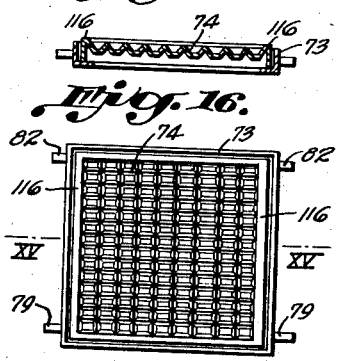
Fig. 15.
Fig. 16.
Inventors:
MAX HEIDELMEYER &
FELIX BECHER
By E. F. Wendroth
Attorney Patented Apr. 29, 1941

2,240,214

UNITED STATES PATENT OFFICE 2,240,214

CONVEYER SYSTEM FOR THE MOLDS IN MACHINES FOR CASTING OR MOLDING CHOCOLATE OR LIKE MASSES

Max Heidelmeyer, Niedersedlitz, and Felix Becher, Dresden-Mockritz, Germany, assignors to the firm of J. M. Lehmann, Dresden, Germany Application January 21, 1938, Serial No. 186,236
In Germany May 12, 1936

6 Claims. (Cl. 107—8)

The present invention relates to a conveyer system for the molds in machines for casting or molding chocolate or like masses.

Such a system is arranged according to Fig. 1 in such manner that the molds F carried by endless chains A are led in a continuous circuit in succession from the dividing machine T through the cooling chamber Sch, past a discharging device and finally through a preheating chamber V back to the dividing machine.

Such a system occupies a large amount of space and the endless chains which carry the molds are of extraordinary great length. Consequently it is not possible to move these long chains say intermittently, the mass thereof being much too great. Moreover it is not possible to drive these chains at variable speed. In the first place, the operation for example at the shaking table or at the discharge point is much too complicated and in the second place the driving devices which would be necessary for this purpose due to the large masses to be moved are much too complicated and would be very heavy. Apart from these facts variable speed over the long travel of the chains over the shaking table, through the cooling chamber, past the discharging device and through the preheating chamber is quite unnecessary because in the region of the dividing machine an extraordinarily fine differentiation in the feeding movement must be produced which cannot be obtained by means of endless chains which are of such length and must be led over as many chain rollers as are necessary in such a conveyer system.

In order to render such an installation technically useful the conveyer chains must therefore be run at uniform speed and in a constant direction of feed.

According to the present invention such a conveyer system for the casting of chocolate in the molds carried by the conveyer chains is so arranged that successive molds of differing dimensions and disposed at different distances apart can be used in one and the same conveyer system so that for example in the same system chocolate blocks, cats' tongues, pralines and so on can be produced.

This difference in distance apart between the successive mold recesses of one mold and the mold recesses of two adjacent molds are automatically compensated for in the pouring operation by means of the present invention.

In known machines of this kind with a continuously rotating conveyer band in which the molds are continuously connected with two lateral endless chains passing over sprocket wheels, the automatic compensation for the difference between the distances apart of the mold recesses to be moved beneath the pouring member and their length during equal suction and discharge periods for the chocolate mass is obtained by setting the container for the mass with its pouring outlet in reciprocating movement, the whole of the drive for the piston movement being required to move continuously to and fro with the container. In other casting machines having a uniformly rotating conveyer band, however, stationary containers were arranged to suit the lengths of the mold recesses, the necessary discharge periods and the corresponding pouring lengths. For this purpose different cam discs having cam surfaces with different angles of inclination with the same height of cam are provided, account being taken of the fact that with comparatively long mold recesses the remaining suction periods are very short. According to the invention the advantages of a machine for continuously casting chocolate in which the molds lie loosely on a short endless conveyer band are combined with those of a machine in which the molds are continuously connected with two endless conveyer chains without a swinging movement of the container for the mass and without alteration of the discharge periods, by mounting the endless mold conveyer band yieldingly in the longitudinal direction only in the region of the mouthpiece of the pouring device and connecting it with a drive so that the mold conveyer band otherwise rotating with uniform speed is moved alternately at higher or lower speeds only in the region of the mouthpiece corresponding to the lengths of the mold recesses and their distances from one another. The endless mold-conveying band while maintaining for the most part its otherwise uniform speed of rotation is led in the region of the mouthpiece over a longitudinally movable carriage or slide which is moved to and fro alternately by a drive of known kind corresponding to the difference between the lengths of the mold recesses and their distances apart. As a result of this the molds moved forwards under the mouthpiece with a uniform direction of motion of the carriage or slide are moved through the necessary additional path with increased total speed which on opposite movement of the carriage or slide in the succeeding equal interval of time is reduced, thus reducing the speed of the molds. In another embodiment the endless mold-conveying band also while for the most part its otherwise uniform speed of rotation is maintained is moved forward only in the region of the mouthpiece by a duplex ratchet gear acting alternately at equal intervals of time at distances corresponding to the lengths of the mold recesses and their distances apart and is held under tension by yieldingly mounted sprockets in the reverse direction.

After the casting operation has been carried out at the point $x$ in Figure 1 the filled molds on their further passage are led forward through a cooling device in the same position as they assume in the filling operation and are then turned over at the point y and discharged.

Generally, there are used in the conveyer system endless chains to which mold holders and not the molds themselves are secured. The molds are inserted in these mold holders which molds may for example be arranged as a frame with individual molds inserted in the cover plate.

The opinion hitherto held was that the molds must be irremovably secured in the mold holders both in order to prevent displacements of the mold in the mold holders and to prevent the molds from falling out of the mold holders on being turned over in the discharging position. For this reason the molds have been held in the mold holders by spring pawls or the like, both the mold holder and also the mold being given a suitable shape for this purpose.

It is desirable that the molds for example the frame mold holding a number of individual molds should be formed in the usual manner i. e. should require no other construction and treatment. The invention meets this requirement in that the molds although of usual construction are laid loosely in the mold holder which is formed simply as a suitable frame. It has been found that it is not disadvantageous for the filling operation if a small amount of play is afforded between the mold and the mold holder as it simplifies insertion and removal of the molds in the mold holder.

With this arrangement the molds would fall out of the mold holder on the mold holder being turned over. This is avoided by the invention arranging that the mold holder with the mold lying loosely therein in the neighbourhood of the point of reversal co-operates with means which positively prevent the mold in the mold holder from falling out until complete reversal is finished and the mold holder with the mold lying therein comes to a guide track which takes care of the further maintenance of the mold in the mold holder.

Since it is quite possible to control the means which hold the molds in their holder at the point of reversal through the medium of the mold holders and their movement there is provided a simple and therefore reliable construction.

This means can be provided in different ways.

Several embodiments of the invention are illustrated by way of example in the accompanying drawings in which Figure 1 is a complete view of a conveyor system in which the arrangements hereinafter described are employed.

Figures 2 and 3 are elevations of a casting or molding device in two different operating positions.

Figures 4 and 5 show another construction of a casting or molding device also in two different operating positions.

Figures 6 to 8 show diagrammatically the basic movement $a$ of the travelling conveyer band and the movement $b$ of the slide increasing or reducing the same.

Figures 11 and 12 show two further embodiments.

Figure 13 shows a part front elevation from the left of Figure 12.

Figure 14 shows the parts of the embodiment shown in Figure 12 in another operative position.

Figures 15 and 16 are details, Figure 16 showing the mold holder with the chocolate molds inserted in plan view and Figure 15 being a horizontal cross section on the line XV—XV of Figure 16.

Figure 9:
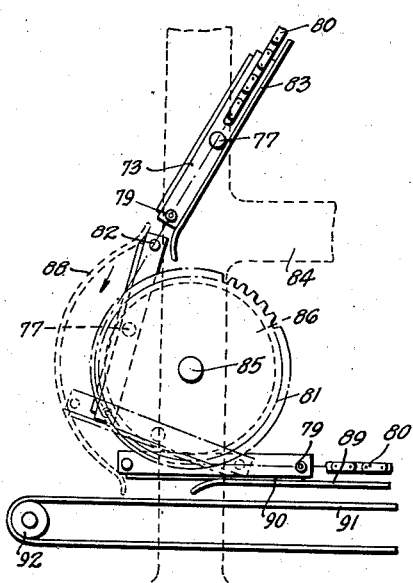
Figure 9 shows a side view of those parts of a conveyer system at which the rotation of the chocolate molds takes place.

In order to make clear the operation of the machine and to bring out clearly the essence of the invention, molds are selected in both embodiments which are provided with long recesses in a single transverse row.

Referring to the drawings, the chain 1 passes over the sprocket wheels 2, 3, 4, 5, 6 and 7 in a closed circuit. To simplify the illustration certain coils which the chain makes and which are shown in Figure 1 are omitted from Figures 2 to 5. This is indicated by dot and dash lines. On the chains 1 which are provided in pairs in parallel flights are mounted the molds 8. The sprocket wheels are also provided in pairs.

The sprockets 3, 4, 5 and 6 are mounted with their axes of rotation fixed in the machine frame. The spindles of the sprockets 2 and 7 however rest in a slide 9 which is movably arranged in slide tracks 10 of the machine frame 11. In the machine frame is also mounted the spindle of the guide wheel 12 which is arranged adjacent the sprocket wheel 3 and serves for guiding the molds parallel to one another when they are led around the sprocket 3.

A similar guide wheel 13 is provided adjacent the sprocket 2. The spindle of the guide wheel 13 is mounted in the reciprocating slide 9.

On the shaft 14 of the sprocket 6 rotatably mounted in the machine frame 11 is also secured a driving pulley 15 over which runs a belt 16 which drives the machine. On this shaft 14 is also mounted a pinion 17 meshing with a pinion 18. This is secured to the spindle 19 which is rotatably mounted in the machine frame. The crank pin 20 is mounted on the pinion 18 eccentrically of the axis of the spindle 19. On the crank pin 20 is arranged a connecting rod 21, the other end of which embraces a pin 22 which is mounted on the slide 9.

On rotation of the wheel 18 the pin 20 is rotated (see also Figure 3). The movement of the crank pin is converted by the connecting rod 21 into a reciprocating movement of the slide 9.

The uppermost flight of the chain which lies between the sprockets 2 and 7 is moved beneath the outlet 24 of a stationary supply 23 which is formed in known manner so that a piston pump, when the piston moves in the one direction, forces the chocolate or the like through the nozzle 24 while on the return stroke further material which is to be forced into the molds is drawn in.

The molds travelling past the supply 23 are supported by guide tracks 25.

The filled molds are guided in the direction of the arrow by the device. After filling they are held by means of guide wheels 12 and 13 in the horizonal position when they are turned around the sprockets 2 and 3. Such devices are known and are therefore not more fully described.

In consequence of the reciprocating movement of the slide 9 the sprockets 2 and 7 are also moved to and fro. They also impart to the chain 1 its reciprocating movement. The chain is given a reciprocating movement because the distance between the fixed sprocket 6 and the movable sprocket 7 is reduced, to the same extent to which the distance apart of the movably mounted sprocket 2 from the fixed sprocket 3 is increased. Vice versa on a reduction of the distance between the wheels 2 and 3 a corresponding increase in the distance apart of the wheels 6 and 7 is produced. The pin 20 is adjustable on the sprocket 18 so that the stroke of the slide 9 can be varied.

In the filling operation the chain is moved under the filling nozzle by the distance $a$ due to its own speed. In addition to this movement $a$ there is the movement $b$ of the slide. The distances $a$ and $b$ together provide the distance $c$ which corresponds to the filling width of the mold.

On the return movement of the filling device return movement of the slide 9 also takes place. The chain 1 is thus displaced through a distance $d$ with respect to the filling opening 24 which is equivalent to the distance $a$ moved by its own speed less the return movement $b$ of the slide 9. By the speed of the chain proper is intended the speed with which it moves in consequence of the drive by the belt 16 over the stationary sprockets. The distance $d$ corresponds to the distance between the rear edge of the filled mold and the front edge of the succeeding empty mold.

As the result during the filling movement of the filling device 23 a distance $c$ is travelled which corresponds to the filling width of the mold and during the return sprocket a distance $d$ is travelled which corresponds to the distance apart of the different molds from one another. Since the speed of the chain 1 itself and the stroke of the slide can be varied, it is possible to vary the distances $c$ and $d$ shown in Figure 6 and thus to render the filling device suitable for different lengths of mold and for different distances from one another. This is advantageous as the mold recesses to be filled with mass in pouring blocks, cats' tongues and so on are of different length and the distances apart of the mold recesses are interchangeable with one another. Obviously care must be taken at the beginning of the ejection of the mass, the front edge of a mold recess must come directly beneath the outlet opening of the filling device.

The device shown in Figures 4 and 5 operates on the same principle.

The chain 1 runs over the sprockets 26, 27, 28, 29, 30, 31. Of these the spindles of the sprockets 27, 28, 29 and 31 are stationary while the spindles of the sprocket wheels 26 and 30 are movably arranged.

The sprocket wheel 26 is mounted in a slide 32 which can be moved with rollers 33 over the guide track 34. This slide 32 is under the influence of a spring 35 which is secured at 36 to the machine frame and tends to displace the slide 32 to the left from the position shown in Fig. 4.

The sprocket wheel 30 is mounted in an eye 37 in a guide rod 38. This rod can be displaced in guides 39 parallel to itself. The guide rod 38 has a collar 40. Between this collar and an abutment surface 41 on the machine frame is arranged a compression spring 42. This spring 42 tends to displace the sprocket 30 to the left so that it holds the chain 1 in tension.

The uniform speed of the chain 1 is produced by the sprocket 29. It is mounted on the shaft 43 on which is also mounted a driving pulley 44 which is driven by the driving belt 45 of the motor 46. The belt pulley 51 is driven from the motor 46 by way of the belts 47, 48 and the belt pulley 50 mounted in a bearing bracket 49. This belt pulley 51 is mounted on the spindle 52 in the machine frame. At the two ends of the spindle 52 are mounted crank discs 53, 54 which carry external crank pins 55, 56. From the crank pin 55 is driven a link 57 which is pivoted at 58 to the lever 60 rotatable about the fixed axis 59. The lever 60 at 61 has a locking pawl 62 which co-operates with the ratchet wheel 63. This wheel is firmly connected with a sprocket wheel 64. On rotation of the crank disc 53 the link 57 is given a reciprocating movement which is converted by means of the pawl 62 into an intermittent rotary movement of the sprocket wheel 64. Each time the pawl 62 is operated the chain 1 is fed by an amount which corresponds to the feeding of the sprocket 64 by the pawl 62.

On the crank pin 56 is pivoted a link 65 which at 66 engages the lever 67 rotatably mounted on the axis 59. The lever 67 at 68 has a pawl 69 which co-operates with the ratchet wheel 70. The ratchet 70 is also firmly connected with the sprocket wheel 64 so that on reciprocating movement of the link 65 an intermittent rotary movement is imparted to the sprocket 64.

As the ratchet levers 60 and 67 are opposite one another on rotation of the crank discs 53 and 54 the one ratchet system becomes effective and then the other ratchet system so that a rotation is produced by the sprocket wheel which corresponds to the stroke of the pawl 62 or the stroke of the pawl 69. In the present construction the arrangement is such that the stroke of the pawl 69 is the greater. When this pawl becomes operative the sprocket wheel 64 is given a greater intermittent rotary movement than when the pawl 62 operates.

The chain is thus fed once by the amount $a$ which corresponds to the normal speed of the chain. Additionally however due to the operation of the pawl 69 there is obtained a feed of an amount $b$ (Figure 6) so that a total feeding movement $c$ is obtained which corresponds to the width of the mold recess.

During the feeding stroke of the pawl 69 more chain is absorbed in the upper flight of the chain lying between the sprockets 26 and 31 than is made available by the normal speed of rotation of the chain. This extra chain is taken from the loop running over the sprocket 30. The distance between the movably mounted sprocket 30 and the fixed sprockets 29, 31 is thus reduced, the spring 42 being compressed.

This spring 42 is made exceedingly strong so that it commences to slacken and in consequence the chain is absorbed in the loop disposed around the sprocket when the stroke of the pawl 69 is completed. Pawl 62 now moves. This movement is smaller than that of the pawl 69. The individual movements of the different pawls follow directly one after the other. They can also be varied by suitably arranged devices of known kind for varying the stroke of the pawls.

When the locking pawl 62 commences to move the chain is fed by an amount $d$ (Figure 6) which is smaller than the amount $a$ corresponding to the normal speed of movement of the endless chain. As the result as already explained at the end of the movement effected by the pawl 69 the spring 42 is strongly tensioned. When now the chain passes with the normal speed of movement over the sprocket 29 a part of this chain is taken up in the loop passing over the sprocket. In consequence the speed of the chain which passes over the sprocket wheel 31 is reduced. This reduction due to the opening of the spring 42 can be so great that the speed of the chain running over the sprocket 31 may be zero or just slightly greater. If however the speed of the chain is not to be reduced but its speed should be so great that during the return stroke of the piston of the filling device the distance d (Figure 6) is traversed which corresponds to the distance between the rear edge of one mold recess and the front edge of the succeeding mold recess and the chain is fed by the pawl 62 through this distance d.

In order that the chain 1 cannot move upwards in the region of the sprocket wheel 64 there is provided over it a bridge like guide 71 which ensures that the chain is actually fed by the teeth 72 of the sprocket 64.

The spring 35 provided on the slide 32 is substantially weaker than the spring 42. It serves to hold the upper flight of the chain 1 in a tensioned condition, but permits displacement of the slide 32 to the right as shown in Fig. 4, when the spring 42 becomes operative. As the spring 42 is very strong it is convenient to provide the guide rod 38 with a limiting stop 38a in order in this way to obtain limitation of the displacement of the guide rod 38 effected by the spring 42.

It is possible by means of the arrangement described to cause the chain 1 with the molds 8 thereon to pass under the filling nozzle 24 in such manner that this nozzle at the commencement of the feeding stroke lies at the forward edge of a mold recess. Thus during the filling stroke the molds over their breadth c pass under the filling nozzle and are filled. On the return stroke of the piston of the filling device the distance d (Figure 6) is bridged over each time and on the associated filling stroke a nozzle is again at the front edge of a mold recess.

The molds are fed in the direction of the arrow through the device. As is clear from the accompanying drawings care is taken that the full molds where they turn around are always guided in a parallel position.

The molds filled in this way pass finally into the region of the point of reversal where they meet means which ensure that the mold will not fall out of the mold holder when complete reversal has taken place and the mold holder with the mold thereon passes to a guide track which takes care of the holding of the mold in the mold holder.

Such a device is shown in Figures 9 to 16. The molds can be shaped as shown in Figs. 3 or 4 or as shown in Figs. 9 to 16.

Figure 10:
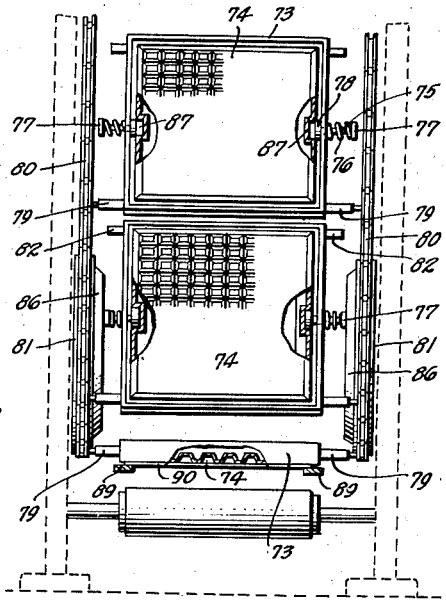
Figure 10 is a front elevation seen from the left in Figure 9.

In the embodiment shown in Figs. 9 and 10 the holders 73 coming downwards at an inclination in which holders the chocolate molds 74 are inserted freely are turned downwards in such manner that the chocolate bodies can fall out of the mold 74. At the same time care must be taken that the chocolate mold 74 does not fall out of the holder 73. For this purpose the holders 73 are provided with movable pins 75 on which the springs 76 are mounted. The springs 76 which are pressed at one side against the frame like holders 73 and at the other against the head shaped enlargement 77 of the pins 75 tend to press the pins 75 outwards, the enlargements 78 provided on the ends of the pins 75 acting as stops. The framelike holders 73 are secured with the pins 79 to conveyer chains 80 which run over the sprockets 81. The pins 82 provided on the other end of the frame-like holder 73 serve as guides and are of no further interest in the present construction. The guide surfaces 83 serve as guides for the downwardly moved mold holders. As soon as the mold holder moves into the path of the sprockets 81 which are mounted on the common shaft 85 in the machine frame 84, the head-shaped enlargement 77 meets the discs 86 provided on the opposite flanks of the sprockets 81, which discs are of spherical form as shown in Fig. 10. By these discs the pins 75 are pressed inwards against the action of springs 76 so that the enlargements 78 enter recesses 87 provided in the molds 74. In this way the mold 74 is held against falling out in the frame-like holder 73 when the latter moves into the path of the discs 86. While the corresponding parts of the chain pass over the sprockets 81 the frame-like holders are turned in such manner (see also the dotted intermediate position) that the molds are turned downwards. The clamping action produced by the resilient pressure of the pins 75 on the discs 86 prevents dropping of the holder out of the plane of the chain. Naturally however adjacent the sprockets there could be arranged a few stationary guide rails with which the guide pins 82 co-operate so that the holders 73 are prevented from falling out of the plane of the chain. The guide rails 88 also provided for the sake of safety if desired are indicated in Fig. 9 in dotted lines. Adjacent the horizontal flight of the chains are provided guide rails 89 on which the turned-over mold with its longitudinal edges 90 bears. The chocolate mold is thus prevented from falling out of the holders when the bolt heads 77 leave the discs 86 so that the other ends 78 of the bolts project from the recesses 87 and thus release the molds. While thus the molds are carried by the rails 89 the chocolate bodies can fall freely on to the upper flight of a conveyer band 91 disposed beneath the guide rails 89, which conveyer band passes over the guide rollers 92. Should the chocolate bodies not be discharged of their own accord from the mold, such discharge can be effected by means of a known shaking device.

Figure 11:
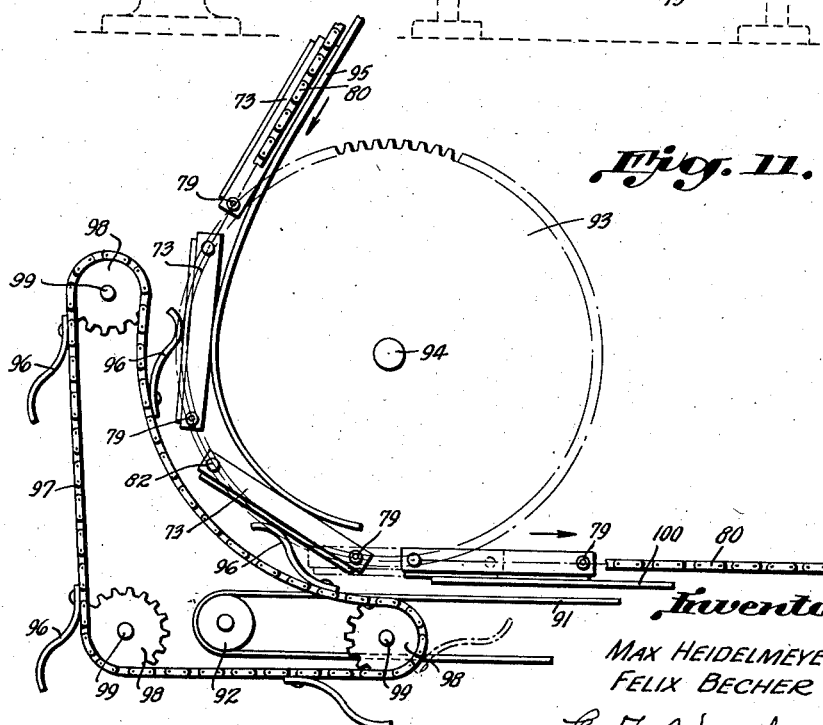

In the embodiment shown in Fig. 11 the chains 80 on which the frame-like holder 73 with the pins 79 are mounted are led over two sprockets 93 which are mounted on the common shaft 94. Guide surfaces 95 are arranged adjacent these chains and are curved in arcuate form adjacent the sprockets 93. In order to prevent the chocolate molds 74 from dropping out of the holders on rotation thereof resilient pressers 96 are arranged adjacent the sprockets 93, which pressers are mounted in pairs on two chains 97. These chains 97 run over sprockets 98 which are mounted in pairs on shafts 99 in the machine frame.

As is clear from the drawing the presser springs 96 hold the chocolate molds or the frame-like holders 73 until these pass on to the rails 100, which correspond to the rails 89 in the embodiment shown in Figs. 9 and 10. Say when the holder reaches the position shown in dotted lines in Fig. 11, the mold 74 leaves the corresponding presser and moves rapidly into the position shown dotted also in Fig. 11.

In the embodiment shown in Figs. 12 to 14 the frame-like holders 73 of the chocolate molds 74 are also carried by conveyer chains 80 which first run parallel to the inclined guide surfaces 105 in the direction of the arrow shown in Fig. 12. The chocolate molds are guided downwards at an inclination over the guide track 105 until they reach the point of reversal at which the chains 80 pass over the pair of sprockets 106. The pair of sprockets 106 are mounted on the shaft 108 in the machine frame 107.

Two rail-like holders 109 are arranged adjacent the sprockets 106, which holders 109 with their extensions 110 are connected at 111 to two bent levers 112. The levers 112 are secured to a spindle 113 mounted on the machine frame, on which spindle is mounted also a weighted lever 114. On the weighted lever 114 is adjustably mounted the weight 115. It is to be noted that the rails 109 are arranged at such a distance from one another that they co-operate with the edges 116 of the chocolate molds 74 (see also Figs. 15 and 16).

The modus operandi of the arrangement shown in Figs. 12 to 16 is as follows:

In the initial position the rails 109 assume say the position indicated in Fig. 12 by full lines. As soon as the downwardly moving mold with its front edge meets the rails 109, the rails and their support 112 are first pressed into the position shown in dotted lines in Fig. 12. On the further movement of the mold it passes finally with its holder 73 into the position shown in full lines in Fig. 12, in which the rails 109 over the total length of the edges 116 bear on the chocolate molds. As a result the mold on the further turning movement of the holder 73 cannot fall out. This support of the rails 109 is continued during the whole turning movement of the holder as is clear from Fig. 14. The full lines indicate an intermediate position while the dotted lines indicate the position into which the rails 109 pass when the holder 73 has moved into horizontal position. The rails 109 maintain this horizontal position until the chocolate mold is taken over by the guide rails 89 arranged adjacent the horizontal flights. As soon as the end of the mold moved forward in the direction indicated by the arrow in Fig. 14 comes into the path of the stop 117 arranged adjacent the rails 109, the rails 109 are released from the chocolate mold and under the weight of the lever 114 and the weight 115 swing again into the position ready for use shown in Fig. 12 where they meet with their forward edge the next mold. The operation is again repeated, the mold bearing against the edges 116 of the chocolate molds and thereby preventing the chocolate mold from falling out of the holder. A conveyer band 91 is arranged adjacent the horizontal flight of the conveyer chain 80 at the point of reversal, which conveyer band receives the chocolate bodies falling from the chocolate mold and delivers them to a collecting station.

We claim:

1. In a molding apparatus for chocolates and the like in which a dispensing outlet for the material is provided and in which a conveyer carrying molds is continuously moved in the same direction at constant speed, the combination comprising a horizontally slidable slide, sprocket wheels mounted on said slide over which said conveyer passes so as to form the upper reach of a loop in the vicinity of said outlet and adjustable drive means for reciprocating said slide to produce an alternate acceleration and deceleration of said loop portion adjacent said outlet.

2. In a molding apparatus for chocolates and the like in which a dispensing outlet for the material is provided and in which a conveyer carrying molds is continuously moved in the same direction at constant speed, the combination comprising a loop formed in said conveyer in the vicinity of said outlet, a shifting wheel co-operating with the reach of said loop adjacent said outlet, means for driving said wheel at different speeds to accelerate and decelerate the portion of the loop of said conveyer adjacent said outlet, a fixed roller for said loop, a second roller for said loop slidably mounted, resilient means acting upon said second roller urging it in the direction of movement of the upper reach of said loop, a third roller for said loop located adjacent said first fixed roller and resilient means urging said third roller in the direction of movement of upper reach of said loop.

3. In a molding apparatus for chocolates and the like in which a dispensing outlet for the material is provided and in which a conveyer carrying molds is continuously moved in the same direction at constant speed, the combination comprising means moving said conveyer at a uniform continuous speed, a looped portion in said conveyer adjacent said outlet, a slide, sprockets on said slide carrying said looped portion and defining the upper reach thereof and means for reciprocating said slide to vary the movement of said looped portion with relation to the movement of the entire conveyer.

4. In a molding apparatus for chocolates and the like in which a dispensing outlet for the material is provided and in which a conveyer carrying molds is continuously moved in the same direction at constant speed, the combination comprising a looped portion in said conveyer adjacent said outlet, a slide, sprockets on said slide carrying said looped portion and defining the upper reach thereof and means for reciprocating said slide to vary the movement of said looped portion with relation to the movement of the entire conveyer, and means for varying the amount of the reciprocations of said slide.

5. In a molding apparatus for chocolates and the like in which a dispensing outlet for the material is provided and in which a conveyer carrying molds is continuously moved in the same direction at constant speed, with a portion of said conveyer moving past said outlet, the combination comprising sprockets supporting said conveyer, a movable sprocket associated with said portion moving past said outlet, a slack take-up device also associated with said conveyer, a ratchet operated sprocket cooperating with said conveyer and means for intermittently operating said last named sprocket to accelerate said portion of said conveyer moving past said outlet.

6. In a molding apparatus for chocolates and the like in which a dispensing outlet for the material is provided and in which a conveyer carrying molds is continuously moved in the same direction at constant speed, the combination comprising a loop formed in said conveyer in the vicinity of said outlet, a fixed sprocket and a movable sprocket cooperating with said loop portion, a slide upon which said movable sprocket is mounted, a spring urging said slide to one end position, a spring take-up device having a stronger spring than said first mentioned spring cooperating with said conveyer and a pawl and ratchet mechanism cooperating with said conveyer for accelerating said loop portion positively and negatively.

MAX HEIDELMEYER.
FELIX BECHER.